United States Patent [19]

Haseloff

[11] 3,780,504

[45] Dec. 25, 1973

[54] LAWN MOWER

[76] Inventor: Fritz Haseloff, Behingstrasse 3, Kassel, Germany

[22] Filed: Mar. 20, 1972

[21] Appl. No.: 236,147

[30] Foreign Application Priority Data
Mar. 29, 1971 Germany.................. P 21 15 101.9

[52] U.S. Cl. .................................. 56/13.6, 56/295
[51] Int. Cl. ........................................... A01d 55/26
[58] Field of Search........................ 56/13.5, 13.6, 6, 56/295; 280/47.11, 62; 180/19 S

[56] References Cited
UNITED STATES PATENTS

| 3,152,431 | 10/1964 | Ott et al............................ | 56/295 |
| 2,763,116 | 9/1956 | Flinchbaugh ....................... | 56/13.6 |
| 2,898,723 | 8/1959 | Goodall ............................. | 56/13.6 |
| 3,196,971 | 7/1965 | Schantz ............................. | 180/19 S |
| 2,582,177 | 1/1952 | Swisher et al. .................... | 180/19 S |

Primary Examiner—Antonio F. Guida
Attorney—Andrus, Sceales, Starke & Sawall

[57] ABSTRACT

A rotary-type lawn mower having a housing and three cutter heads, each of which includes a blade mounted to rotate about a vertical axis, are mounted in triangular relation within the housing. One of the cutter heads is located along the longitudinal center line of the housing while the other cutter heads are located forwardly and laterally outward of the central cutter head. Wheels are mounted on opposite sides of the housing and the wheels are positioned so that the cutting zone of each forward cutter head is located a substantial distance ahead and laterally outward of the respective wheel. A third pivotable wheel is attached to the rear end of the housing to said in steering.

5 Claims, 2 Drawing Figures

PATENTED DEC 25 1973   3,780,504

LAWN MOWER

BACKGROUND OF THE INVENTION

Various types of lawn mowers are presently utilized, for instance those powered by gasoline engines or electric motors, those propelled manually, and so-called lawn tractors or riding mowwrs All of these lawn mowers have the drawback in that the carriage wheels, in order to allow travel of the unit, are located on the outside of the rotating blade system. Thus it is very difficult to effectively cut the edge of the lawn when the lawn or grass is situated at a higher level than the earth next to it. During mowing in the vicinity of the edge, or on the edge itself, not only is handling of the mower difficult, but the cutting process becomes critical, in that when the mower is moved to the edge of the lawn, the edge may break off, or before the blade system reaches the outermost portion of the lawn edge, the front wheels of the mower hang in the air and the mower drops to the surrounding earth under its own weight. When the mower drops, the blade may destroy the edge of the lawn, and may also become blocked in the soil. When operating on the edge of the lawn, the operator may try to keep the mower in equilibrium during the drop, but apart from the necessity of exerting considerable force, it requires considerable skill.

With the use of conventional lawn mowers, it is also difficult to mow a lawn edge along its length. In such a case, one pair of wheels ride on the lawn and the other pair of wheels ride on the earth, and the inclined position of the lawn mower reduces the effectiveness of the cutting.

It is not possible, with the use of conventional rotary lawn mowers, to cut the grass all the way up to the trunk of a tree or other post, since the blade and the post or tree make contact only at a given point. The complete removal of grass can be obtained only by additional cutting by hand shears or by repeated approach with the mower.

In the same manner it is also difficult to cut the edge of lawns bordered by rocks, curbs, or slab paths, since only in rare instances is the surface of the curb or the path at the same level as the surface of the lawn. As a consequence, the lawn mower tends to tilt due to the difference in levels, resulting in ineffective cutting and possible damage to the blade system.

The conventional lawn mower is at most steerable in a limited manner. After making one pass, it is necessary to rotate the mower 180° for the next pass, or in the case of square mowing to rotate the mower by 90°, and in so rotating the mower, the cut grass area is scarred.

With the so-called riding mowers, the same problems arise and the lawn mowing is even more critical, since the blade system is beneath the rider and he cannot see the actual operating position.

SUMMARY OF THE INVENTION

The present invention tends to eliminate the drawbacks that have been associated with conventional lawn mowers. In accordance with the present invention, the lawn mower includes three cutter heads that are disposed in such a manner that, in the direction of travel of the lawn mower, two cutter heads are located forwardly and the third cutter head is positioned behind and centrally of the two forward cutter heads. The cutting zones of the forward cutter heads, as well as the rear cutter head extend both longitudinally and transversely over the path of travel of the wheels, so that the wheels can be safely situated on the lawn surface, while the blades of the cutter heads fully cover the lawn edges. Furthermore, the blades of the cutter heads can also be brought into a position where they partially surround posts, trees, etc., and thus the mower provides more effective cutting of the grass close to these objects.

Other objects and advantages will appear in the course of the following description.

DESCRIPTION OF THE DRAWINGS

The drawing illustrate the best mode presently contemplated of carrying out the invention.

In the drawings.

Figure 1:
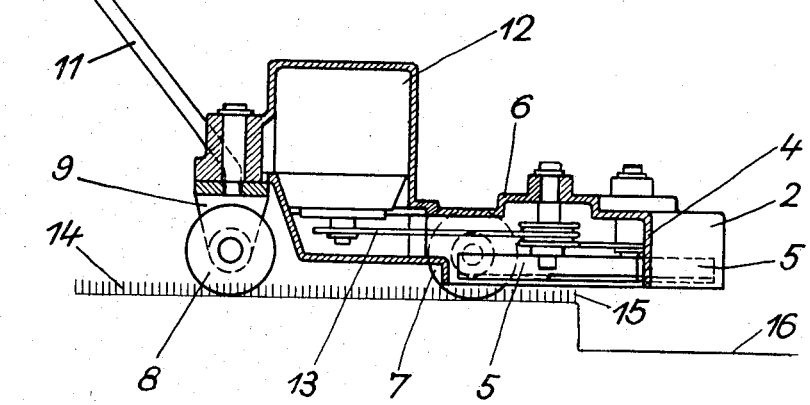
FIG. 1 shows a lawn mower with motor drive viewed from the side, partly in section.
Figure 2:
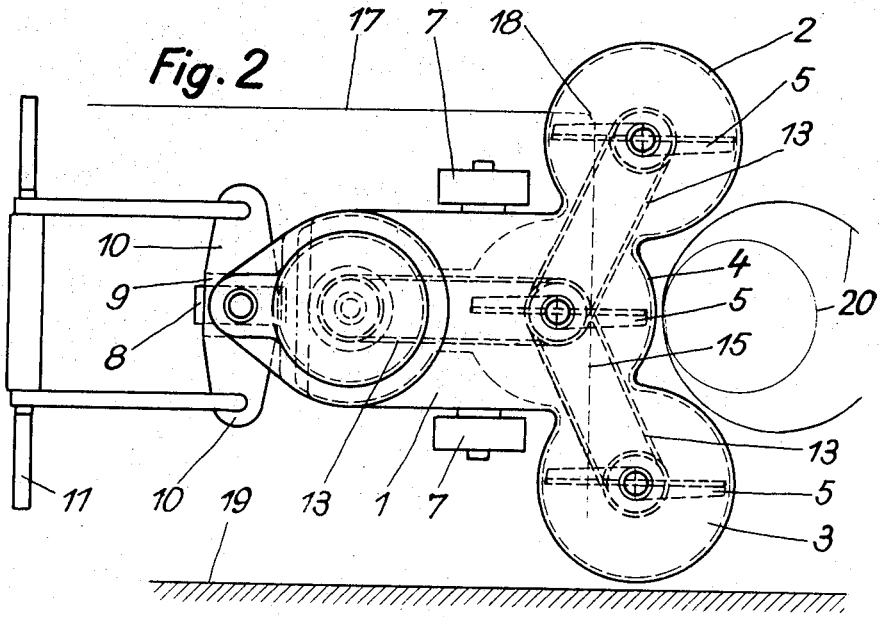
FIG. 2 is a top plan view of the lawn mower shown in FIG. 1.

The lawn mower 1 shown in FIGS. 1 and 2, comprises three cutter heads 2, 3, and 4 having cutter blades 5. Cutter heads 2, 3, are situated laterally outward and ahead, in the direction of mower travel, of the center cutter head 4.

The cutter heads 2, 3, and 4 are incorporated in a chassis or housing 6 that also forms a protective cover. On the chassis 6 are disposed carriage wheels 7 and a steering wheel 8 that is supported in a pivot mounting 9. The outwardly extending legs 10 of the pivot mounting 9 carry a handle 11.

The drive motor or engine 12 is situated, for the purpose of balancing the weight of the cutter heads 2, 3, 4, in the triangle defined by the carriage wheels 7 and of the steering wheel 8 in a compartment of the housing 6. The blades 5 are driven by motor drive 12 by suitable transmission members 13, preferably by cable, V-belt or chain drive. In the case of belt drives, it is possible by the selection of suitable materials and/or by corresponding angle of grip, to differentiate the friction resistance in such a manner to provide a slip coupling, so that a blade blocked by a foreign body stops and cannot be forcibly damaged.

It is contemplated that the blades 5 can be driven by the carriage wheels 7 by means of a transmission, not shown in the drawings. It is also contemplated that the position of cutter heads 2, 3, could be adjusted around the center cutter head 4, to provide an adjustable cutting width for the lawn mower 1.

The drawings do not show the mechanism that regulates the height of cut, nor the baffle plates for the ejection of the grass, both of which are conventional features.

The cutter heads 2, 3, 4, are positioned in relation to carriage wheels 7 so that the cutters heads 2, 3, 4 extend forwardly of the carriage wheels 7 of the mower 1 in the direction of mower travel. Thus the carriage wheels 7 can be situated on the lawn 14 with the outer edges of the cutter heads 2, 3, 4, projecting over the ground 16, to enable the lawn edge 15 to be clearly cut, as shown in FIG. 1.

For the mowing of a longitudinal edge 17, both the left or the right cutter head 2, 3, extends laterally beyond the corresponding carriage wheel 7, so that, as shown in FIG. 2, the carriage wheel 7 can ride on the lawn a substantial distance from the longitudinal edge 17 on the ground 16 and because of the overhang, the cutter head 2 will cut the lawn 14 up to the longitudinal edge 17.

With the present cutter system, it is also possible to mow a lawn corner 18 formed by the lawn edge 15 and longitudinal edge 17, without the lawn mower dropping to the ground 16. In the same manner, there are no problems in mowing the lawn 14 directly up to the wall 19 or to rock curbs, or to slab paths.

As the cutter heads 2, 3, 4, are staggered in a triangle, and as the cutter heads 2 and 3 are housed within separate, generally cylindrical sections of housing 6, the cutting of the grass adjacent laundry posts or trees 20 up to medium size is facilitated, since the cutter heads 2, 3, and 4 partially surround the object 20, as shown in FIG. 2.

As a further advantage, the turning of the mower during mowing is made easier by the steering wheel 8 that is steered by handle 11.

Finally, it should be pointed out that because of the three relatively small cutter heads 2, 3, 4, in relation to the total size of the lawn mower 1 and in relation to the small weight of the unit, it is possible to obtain a relatively wide cutting width of, for example, 28 inches, something that normally is possible only with larger riding-type mowers.

Various modes of carrying out the invention are contemplated as being within the scope of the following claims particularly pointing out and distinctly claiming the subject matter which is regarded as the invention.

I claim:

1. A lawn mower, comprising a housing including a main housing section and a pair of generally cylindrical outer housing sections that communicate with said main section; each of said outer housing sections being located laterally outward and forwardly of the main housing section, the forward extremity of the main housing section being located to the rear of the forward extremities of the outer housing sections to provide the housing with a central forwardly facing recess, a central cutter head located within the forward portion of the main housing section and including a blade mounted for rotation on a vertical shaft, a pair of outer cutter heads with each outer cutter head being disposed in an outer housing section and each outer cutter head including a blade mounted for rotation on a vertical shaft, a pair of wheels journalled on opposite sides of the main housing section with each wheel located to the rear of the corresponding outer housing section, each outer housing section extending a substantial distance laterally outward of the corresponding wheel and extending forwardly from the corresponding wheel in the direction of mower travel, a third wheel mounted on the main housing section and located to the rear of said pair of wheels, and drive means carried by the housing and operably connected to the vertical shaft of each cutter head to drive the respective blades.

2. The lawn mower of claim 1, wherein said drive means includes a prime mover and a belt drive mechanism operably connecting the output of the prime mover with the shafts of the respective cutter heads.

3. The lawn mower of claim 1, wherein the axes of the wheels are located to the rear of the vertical shaft of the central cutter head.

4. The lawn mower of claim 1, and including pivotal means for pivotally connecting said third wheel to the rear portion of the main housing section.

5. The lawn mower of claim 4, wherein said pivotal means includes a pair of generally horizontal outwardly extending legs, and a handle connected to said legs.

* * * * *